United States Patent
Mustafa et al.

(10) Patent No.: US 12,354,593 B1
(45) Date of Patent: Jul. 8, 2025

(54) EFFICIENT VOICE SYNTHESIS USING FRAME-BASED PROCESSING

(71) Applicant: Amazon Technologies, Inc., Seattle, WA (US)

(72) Inventors: Ahmed Mustafa, Aachen (DE); Jean-Marc Valin, Montreal (CA); Jan Buethe, Munich (DE); Paris Smaragdis, Urbana, IL (US); Michael Mark Goodwin, Scotts Valley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 290 days.

(21) Appl. No.: 18/194,572

(22) Filed: Mar. 31, 2023

(51) Int. Cl.
  G10L 13/08 (2013.01)
  G10L 13/04 (2013.01)
  G10L 15/16 (2006.01)

(52) U.S. Cl.
  CPC .............. *G10L 13/04* (2013.01); *G10L 15/16* (2013.01)

(58) Field of Classification Search
  None
  See application file for complete search history.

(56) References Cited

U.S. PATENT DOCUMENTS

| | | | |
|---|---|---|---|
| 10,896,669 B2 | 1/2021 | Arik et al. | |
| 11,069,335 B2 | 7/2021 | Pollet et al. | |
| 11,322,135 B2* | 5/2022 | Shechtman | G10L 15/1807 |
| 2023/0068798 A1* | 3/2023 | Etchart | G06T 7/74 |
| 2023/0073364 A1* | 3/2023 | Malik | H04L 63/0861 |

* cited by examiner

*Primary Examiner* — Jakieda R Jackson
(74) *Attorney, Agent, or Firm* — S. Scott Foster; Kowert, Hood, Munyon, Rankin & Goetzel, P.C.

(57) ABSTRACT

Efficient voice synthesis using frame-based processing may be performed. An audio processing system converts an input speech waveform to an acoustic feature representation, which includes a sequence of frames at a lower resolution than the sampling resolution of the input waveform. The system propagates the acoustic feature representation through GRUs and fully-connected layers, while maintaining the lower resolution. At the end, the system performs a flattening operation on the frames of the final acoustic feature representation to generate an output waveform at a target sampling resolution.

20 Claims, 7 Drawing Sheets

EFFICIENT VOICE SYNTHESIS USING FRAME-BASED PROCESSING

BACKGROUND

Over the past few years, audio processing methods (e.g., voice synthesis to generate and/or process human speech) based on deep learning have greatly surpassed traditional methods (e.g., due to various techniques such as spectral subtraction and spectral estimation). Audio processing methods may be used in a variety of applications. For example, a teleconferencing system may be used in a noisy and reverberant environment, so audio processing/voice synthesis techniques may be needed to ensure clear communication (e.g., to fill in missing portions of speech).

Vocoders may be used to enhance audio by creating a time-domain voice signal from a representation such as a set of speech-related parameters, a spectrogram, or acoustic/phonetic features. Vocoders based on generative adversarial networks (GANs) use machine-learning powered generative models, and may be used for various applications. However, these models are computationally prohibitive for low-resource devices (e.g., smartphones and various other IoT (internet of things) devices, since the models synthesize a voice signal on a sample-by-sample basis.

Figure 1:
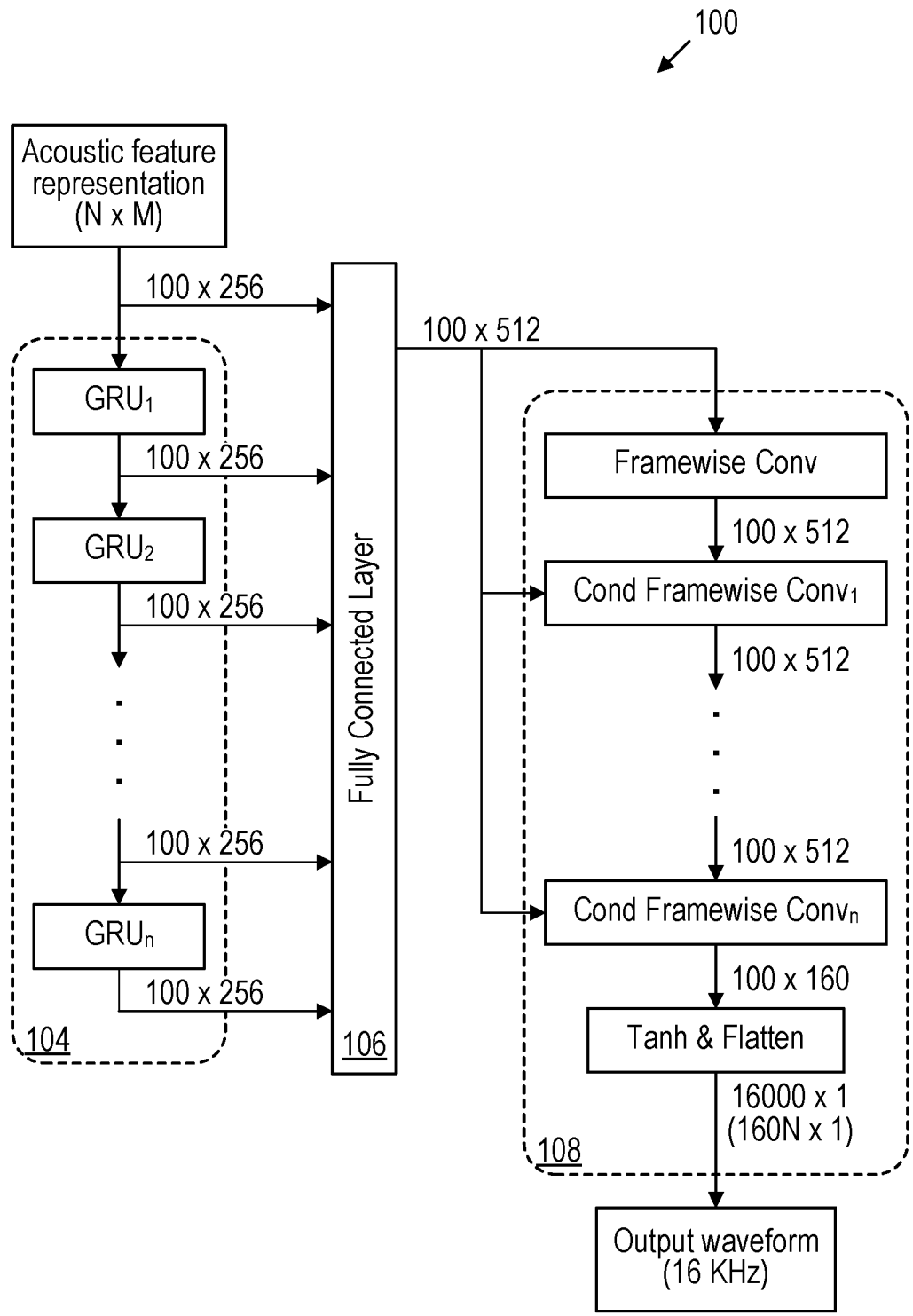
FIG. 1 illustrates a logical block diagram of an example system for efficient voice synthesis using frame-based processing, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for efficient voice synthesis using frame-based processing are described herein. With the ubiquitous presence of audio communication systems, it can be advantageous to use audio processing algorithms that operate with low complexity and/or in real time or near real time. In some embodiments, in order to satisfy real time requirements for an application, a timeliness threshold (e.g., a value specified in milliseconds or other unit of time) is set by a client or by an audio transmission service, in order to provide results/audio waveforms with little or no human-perceptible delay. Vocoders based on generative adversarial networks (GANs) use machine-learning powered generative models, but the models used may be designed to run on hardware and/or software that is unavailable for use with many types of computing devices (e.g., smartphones and various IoT devices that lack the required hardware components, such as higher end processors and larger amounts of memory). In embodiments, these models may be computationally prohibitive for low-resource devices since they synthesize the voice signal on a sample-by-sample basis.

In various embodiments described herein, an architecture for GAN vocoding may substantially reduce the complexity of performing audio processing (e.g., voice synthesis) by instead generating the model output frame by frame. As described herein, the model may maintain the quality of traditional sample-based GAN approaches while operating at the complexity level of parametric vocoders. This approach may be used in various audio processing applications such as low-rate speech coding, text-to-speech synthesis, and speech enhancement.

FIG. 1 illustrates a logical block diagram of an example system for efficient voice synthesis using frame-based processing, according to some embodiments. Traditional techniques require a large amount of computing power (e.g., many billions of floating point operations per second) in order generate speech waveforms in a samplewise manner. In the depicted example architecture, a first stage uses a number of GRUs to model long-term dependencies of a speech waveform and a second stage uses a number of fully-connected layers to model short-term dependencies of the speech waveform in a framewise manner while maintaining the resolution (e.g., 100 Hz), before performing a flattening operation on the frames of the acoustic representation to generate the output waveform at a target sampling resolution (e.g., 16 KHz). By generating a time domain signal in this framewise manner, the output waveform may be obtained more quickly and/or using lower-complexity CPUs/devices, compared to traditional techniques that generate speech waveforms in a samplewise manner.

Figure 3A:
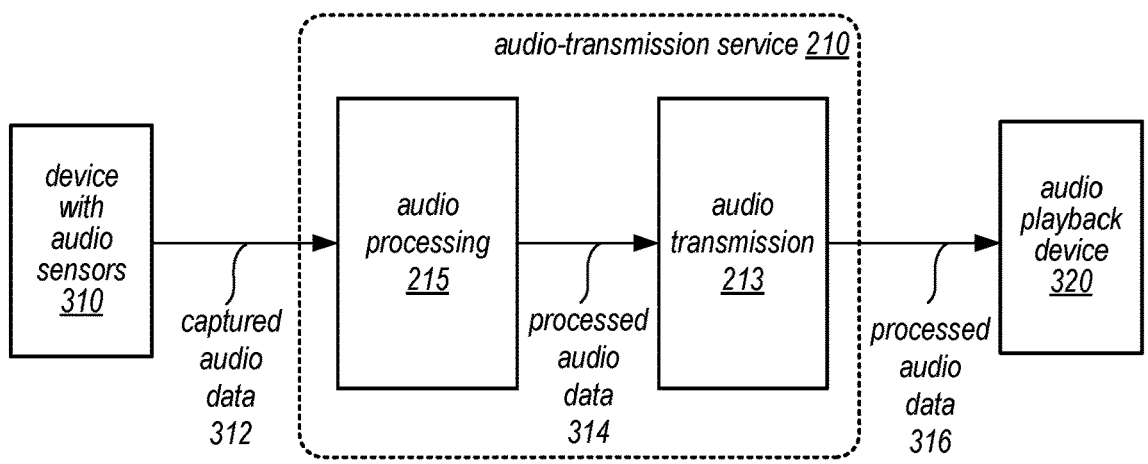
FIGS. 3A-3C illustrate logical block diagrams of different interactions of an audio sensor with provider network services, according to some embodiments.

In various embodiments, the audio processing system 100 may be implemented as part of various network-based systems or services or stand-alone systems that receive audio data (e.g., a speech waveform, which may include target speaker audio and various background audio) and provide as output enhanced audio data (e.g., an output waveform, which may include enhanced target speaker audio and various background audio). For example, an audio processing system 100 may be implemented "service-side," as illustrated in FIG. 3A, where the audio sensors that capture the audio data may be separate from a service or system that implements audio processing system 100. In such embodiments, the audio data may be sent from the audio sensor/microphone (e.g., over a network connection) to the system or service for audio processing. In other embodiments, audio processing system 100 may be implemented as part of a same device as the audio sensor (e.g., as part of an audio processing component or system implemented within a device that includes an audio sensor, such as a mobile phone or device, including various types of "smart" phones, "smart" speakers, "smart" televisions, content delivery or audio/video streaming devices that capture audio data, and so on).

In the example embodiment, the audio processing system receives an acoustic feature representation of a speech waveform. The acoustic feature representation may include a sequence of frames at a lower resolution (e.g., 100 Hz) than the sampling resolution of the original speech waveform (e.g., 16 KHz), wherein a given frame of the sequence of frames comprises a set of values that represent a portion of the acoustic feature representation (256 features per frame, in the depicted example). In various embodiments, the acoustic feature representation may be generated and/or provided by any suitable source (e.g., a text to speech system, decompressed from another network source, etc.). In some embodiments, the acoustic feature representation may be a feature representation of an audio signal (e.g., a 16 KHz speech waveform) that was collected/generated using an audio sensor(s) (e.g., one or more microphones that sense a target speaker's voice).

In the depicted example, the acoustic feature representation includes 256 features at a resolution of 100 frames per second (100 Hz). However, in various embodiments, any resolution (N) may be used with any number of features (M). In the illustrated example, the acoustic feature representation is 100 Hz (N)×256 features (M). In the example, the number of features changes during processing of the acoustic feature representation. In the depicted example, after flattening, the output waveform is 16 KHz (e.g., 16,000×1).

The audio processing system 100 then propagates the acoustic feature representation through any number of gated recurrent units 104 (GRUs). The audio processing system 100 then concatenates outputs of each of the GRUs with the acoustic feature representation to form a concatenated value. The audio processing system propagates the concatenated value through a fully connected layer 106 (e.g., linear) to generate a modified acoustic feature representation at the lower resolution (e.g., 100 Hz). In the depicted example, the audio processing system also changes each frame to include a set of 512 values.

The audio processing system then propagates the modified acoustic feature representation through a fully-connected layer to perform framewise convolution and then through one or more fully-connected layers 108 to perform conditional framewise convolution to generate a final acoustic feature representation at the lower resolution. In some embodiments, to perform a conditional framewise convolution, a conditional neural network is used that includes one or more convolutional layers, one or more pooling layers, and a final fully connected layer. In the depicted example, the audio processing system changes each frame to include a set of 160 for the final acoustic feature representation. The audio processing system then performs a flattening operation on the frames of the final acoustic feature representation to generate an output waveform at a target sampling resolution (e.g., 16 KHz (same as the input speech waveform) or some other target resolution). As discussed above, any resolution (N) may be used with any number of features (M) for the acoustic feature representation. In embodiments, the number of features (M) may also increase or decrease during any of the processing stages/layers. In the depicted example, the initial acoustic feature representation received by the audio processing system is 100×256 (100 frames per second, 256 features per frame). As shown, after propagating through the fully connected layer 106, the acoustic feature representation is modified to be 100×512 (100 frames per second, 512 features per frame). After the final conditional framewise convolution, the acoustic feature representation is modified to be 100×160 (100 frames per second, 160 features per frame). The flattening operation generates the final output waveform at 16 KHz (as shown, the output waveform may also be represented as 16000×1 or 160N×1, to indicate a 16 KHz audio sample over one second).

The audio processing system then sends, via the interface of the audio processing system, the output waveform to a destination. In some embodiments, the speech waveform is captured along with corresponding video data, and the video data may be provided to a same destination as the output waveform.

This specification includes a general description of a provider network that implements multiple different services (FIG. 2), including an audio-transmission service, which implements efficient audio processing using frame-based processing. Then various examples of, including different components/modules, or arrangements of components/modules that may be employed as part of implementing the services are discussed in FIGS. 3A-3C. A number of different methods and techniques to implement efficient audio processing using frame-based processing are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
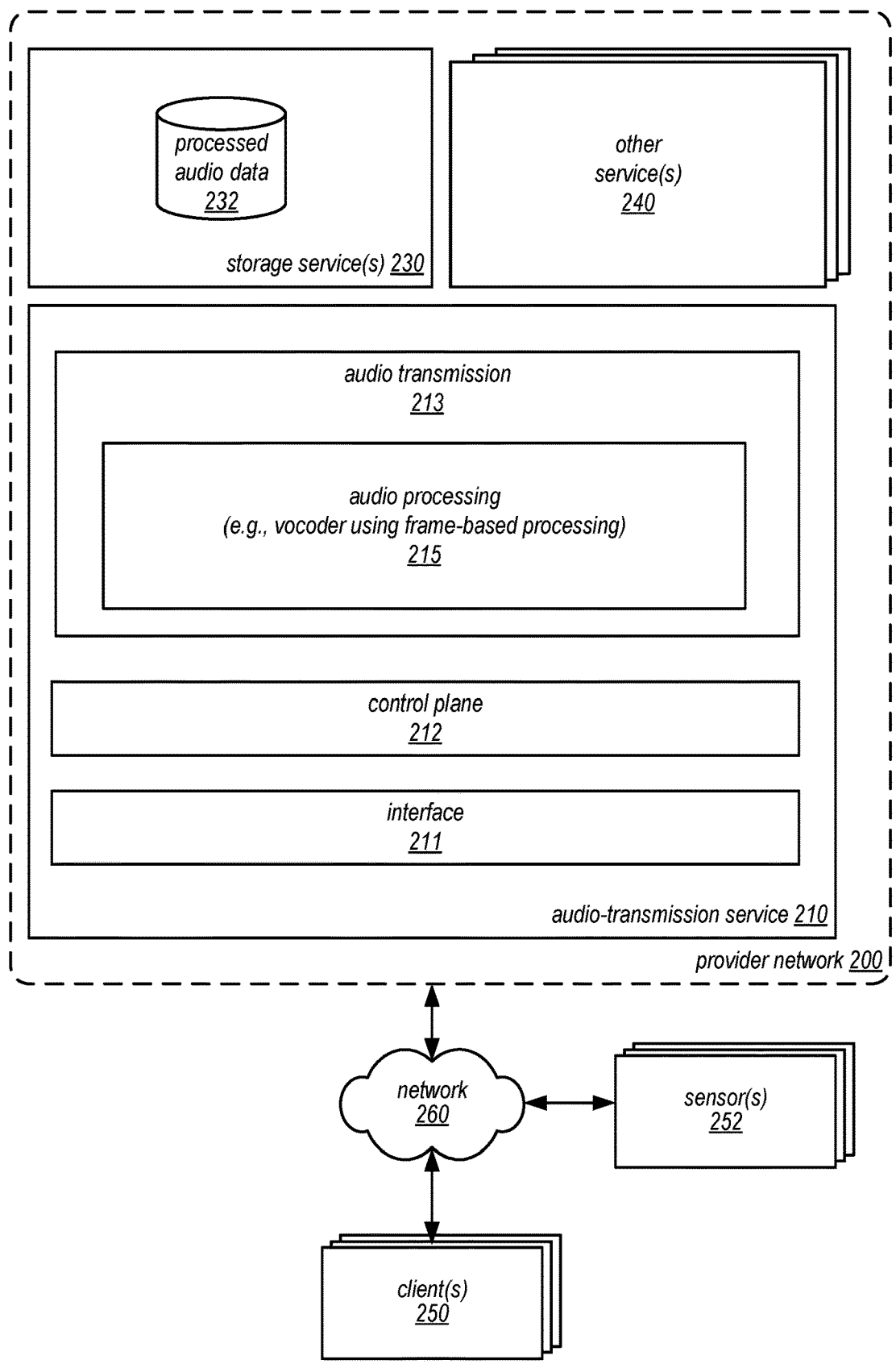
FIG. 2 illustrates an example provider network that may implement an audio-transmission service that implements efficient voice synthesis using frame-based processing, according to some embodiments.

FIG. 2 illustrates an example provider network that may implement an audio-transmission service that implements efficient voice synthesis using frame-based processing, according to some embodiments.

Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 700 described below with regard to FIG. 7), needed to implement and distribute the infrastructure and services offered by the provider network 200, in one embodiment. In some embodiments, provider network 200 implements various computing resources or services, such as audio-transmission service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of audio-transmission service 210 may be implemented by a particular node or may be distributed across several nodes. In some embodiments, a given node may implement the functionality of more than one service system component (e.g., more than one data store component).

Audio-transmission service 210 implements interface 211 to allow clients (e.g., client(s) 250 or clients implemented internally within provider network 200, such as a client application hosted on another provider network service like an event driven code execution service or virtual compute service) to send audio data (e.g., speech input waveform or acoustic feature representation of a speech waveform) for processing, enhancement, storage, and/or transmission. In at least some embodiments, audio-transmission service 210 also supports the transmission of video data along with the corresponding audio data and thus may be an audio/video transmission service, which may perform the various techniques discussed above with regard to FIG. 1 and below with regard to FIGS. 3A-10 for audio data captured along with video data. For example, audio-transmission service 210 may implements interface 211 (e.g., a graphical user interface, programmatic interface that implements Application Program Interfaces (APIs) and/or a command line interface) so that a client application can submit an audio stream captured by sensor(s) 252 to be stored as enhanced audio data 232 stored in storage service(s) 230, or other storage locations or resources within provider network 200 or external to provider network 200 (e.g., on premise data storage in private networks). Interface 211 allows a client to cause audio processing using the techniques discussed above with regard to FIG. 1 and below with regard to FIGS. 3A-6, (e.g., as part of audio transmission, such as voice transmission like Voice over IP (VoIP) or as part of an audio/video transmission in accordance with WebRTC or another suitable audio/video transmission protocols.

Audio-transmission service 210 implements a control plane 212 to perform various control operations to implement the features of audio-transmission service 210. For example, control plane 212 may monitor the health and performance of requests at different components audio-transmission 213 and audio processing 215 (e.g., the health or performance of various nodes implementing these features of audio-transmission service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s). For example, control plane 212 may receive requests interface 211 which may be a programmatic interface, and identify an available node to begin work on the request.

Figure 3B:
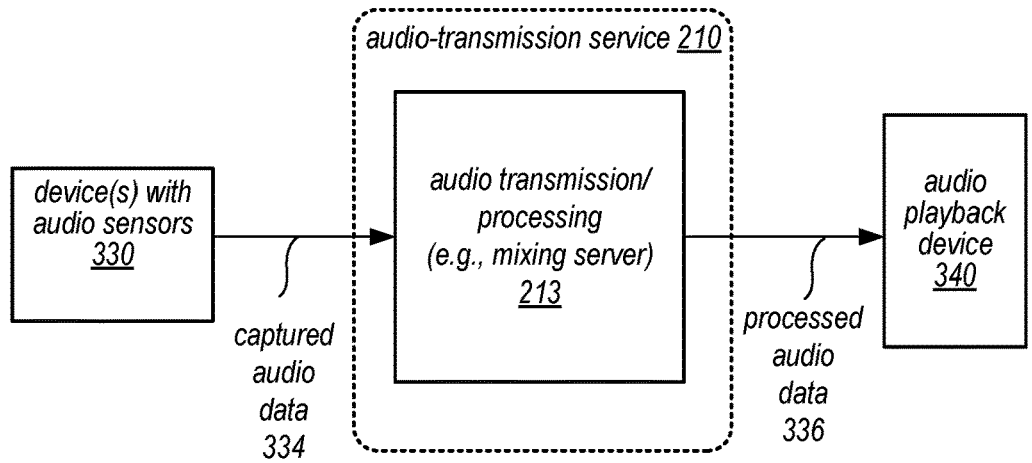

Audio-transmission service 210 implements audio-transmission 213, which may facilitate audio communications (e.g., for audio-only, video, or other speech communications), speech commands or speech recordings, or various other audio transmissions, as discussed in the examples below with regard to FIGS. 3A and 3B. Audio-transmission service 210 implements audio processing 215 to provide an audio processing system (e.g., audio processing system 100 in FIG. 1 or a similar system), which may include audio processing systems, like those discussed below with regard to FIGS. 4-6 and techniques like those discussed below with regard to FIG. 7. In embodiments, audio processing 215 may implement any number of communication techniques, such as a vocoder that implements frame-based processing, speech compression algorithms, filling in holes due to loss of packets, improving or enhancing the quality of a waveform/speech, etc. Although the audio processing 215 is depicted as a part of implementing audio-transmission 213, in various embodiments some or all of the audio processing may be implemented separate from audio transmission 213 (e.g., performed before and/or after audio transmission 213).

Data storage service(s) 230 may implement different types of data stores for storing, accessing, and managing data on behalf of clients 250 as a network-based service that enables clients 250 to operate a data storage system in a cloud or network computing environment. Data storage service(s) 230 includes various kinds relational or non-relational databases, in some embodiments. Data storage service(s) 230 includes object or file data stores for putting, updating, and getting data objects or files, in some embodiments. Data storage service(s) 230 may be accessed via programmatic interfaces (e.g., APIs) or graphical user interfaces. Enhanced audio 232 is put and/or retrieved from data storage service(s) 230 via an interface for data storage services 230, in some embodiments, as discussed below with regard to FIG. 3C.

Generally speaking, clients 250 may encompass any type of client that can submit network-based requests to provider network 200 via network 260, including requests for audio-transmission service 210 (e.g., a request to enhance, transmit, and/or store audio data). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other application that may make use of audio-transmission service 210 (or other provider network 200 services) to implement various applications. In some embodiments, such an application includes sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 generates network-based services requests according to a Representational State Transfer (REST)-style network-based services architecture, a document or message-based network-based services architecture, or another suitable network-based services architecture.

In some embodiments, a client 250 provides access to provider network 200 to other applications in a manner that is transparent to those applications. Clients 250 convey network-based services requests (e.g., requests to interact with services like audio-transmission service 210) via network 260, in one embodiment. In various embodiments, network 260 encompasses any suitable combination of networking hardware and protocols necessary to establish network-based-based communications between clients 250 and provider network 200. For example, network 260 may generally encompass the various telecommunications networks and service providers that collectively implement the Internet. Network 260 also includes private networks such as local area networks (LANs) or wide area networks (WANs) as well as public or private wireless networks, in one embodiment. For example, both a given client 250 and provider network 200 are respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 communicate with provider network 200 using a private network rather than the public Internet.

Sensor(s) 252, such as microphones, may, in various embodiments, collect, capture, and/or report various kinds of audio data, (or audio data as part of other captured data like video data). Sensor(s) 252 may be implemented as part of devices, such as various mobile or other communication and/or playback devices, such as microphones embedded in "smart-speaker" or other voice command-enabled devices. In some embodiments, some or all of audio processing techniques are implemented as part of devices that include sensors 252 before transmission of enhanced audio to audio-transmission service 210, as discussed below with regard to FIGS. 3B and 3C.

Figure 3C:
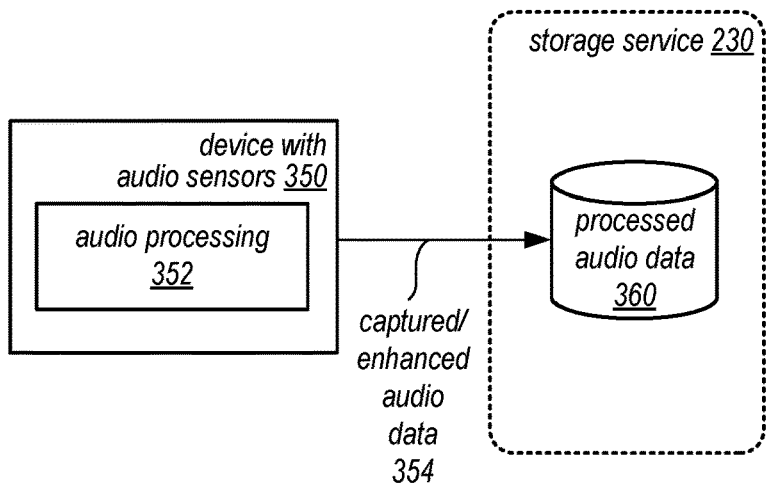

As discussed above, different interactions between sensors that capture audio data and services of a provider network 200 invoke audio processing, in some embodiments. FIGS. 3A-3C illustrate logical block diagrams of different interactions of an audio sensor with provider network services, according to some embodiments.

In FIG. 3A, audio sensor 310 may capture audio data from various environments, including speech audio from noisy environments as discussed above with regard to FIG. 1. Device with audio sensor 310 sends directly captured audio data 312 to audio-transmission service 210, in some embodiments, via an interface for audio-transmission service 210 (e.g., interface 211), such as by sending captured audio data 312 over wired or wireless network connection to audio-transmission service 210. In some embodiments, device with audio sensor 310 provides the captured audio data to another device that sends the capture audio data 312 to audio-transmission service (not illustrated). Capture audio data is transmitted as an audio file or object, or as a stream of audio, in some embodiments. For instance, for live communications, such as a VoIP call, captured audio data 312 is a stream of audio data.

Figure 4:
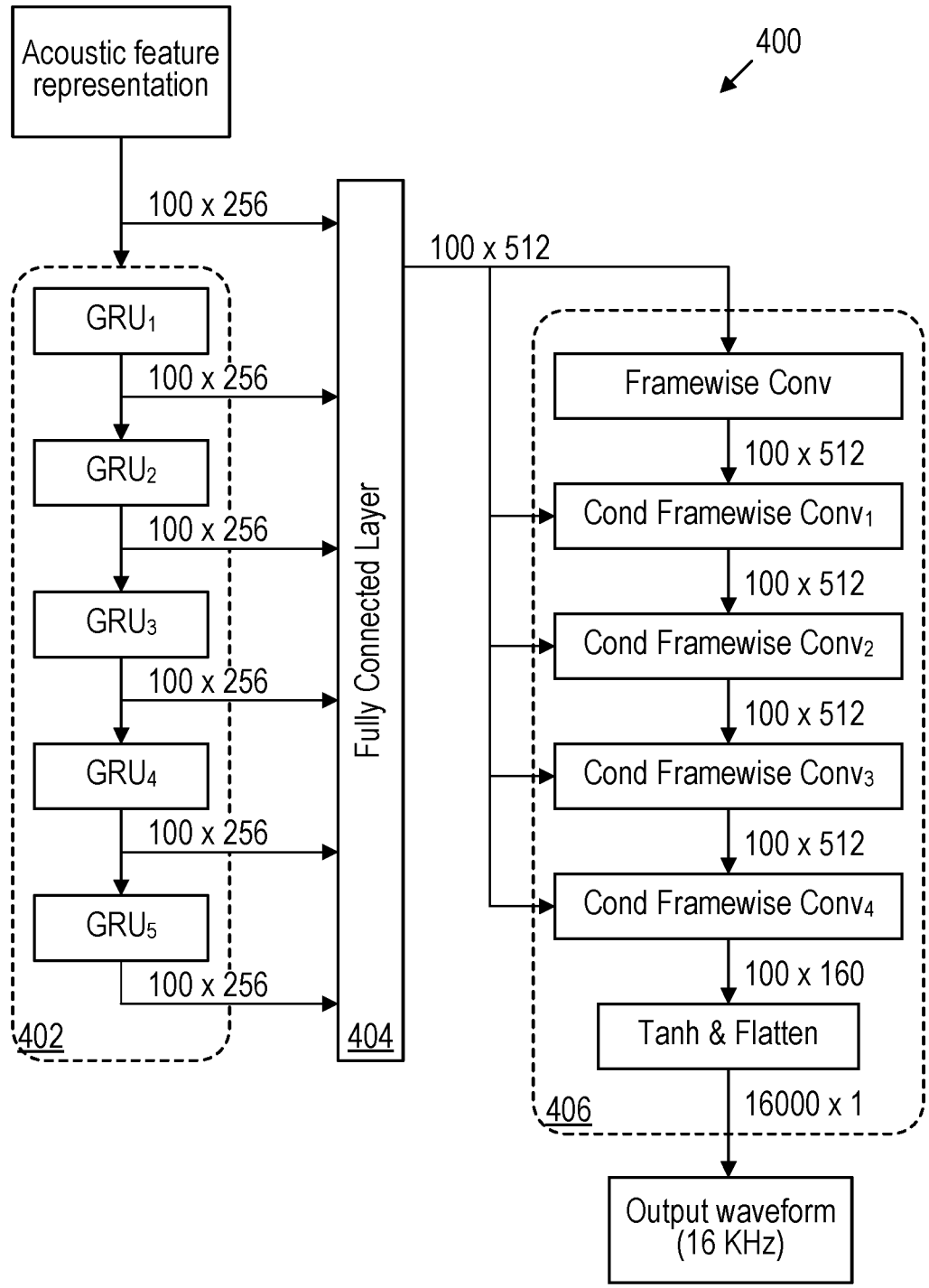
FIG. 4 illustrates a logical block diagram of an example system for efficient voice synthesis using frame-based processing, according to some embodiments.
Figure 5:
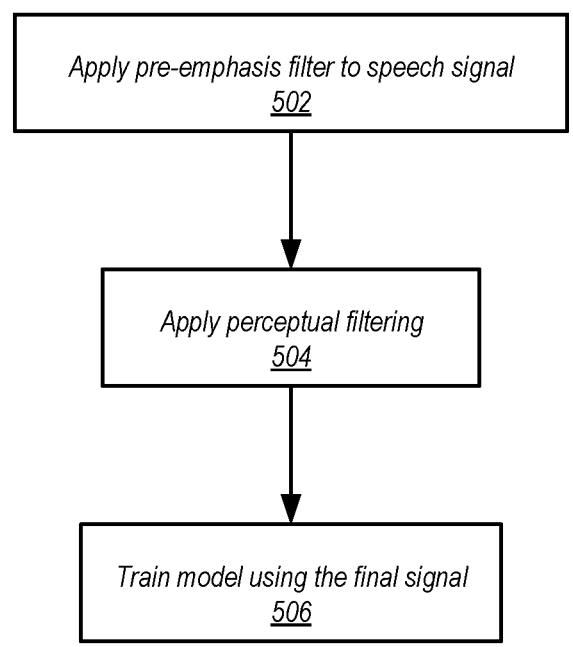
FIG. 5 illustrates a high-level flowchart of various methods and techniques to implement model training for efficient voice synthesis using frame-based processing, according to some embodiments.
Figure 6:
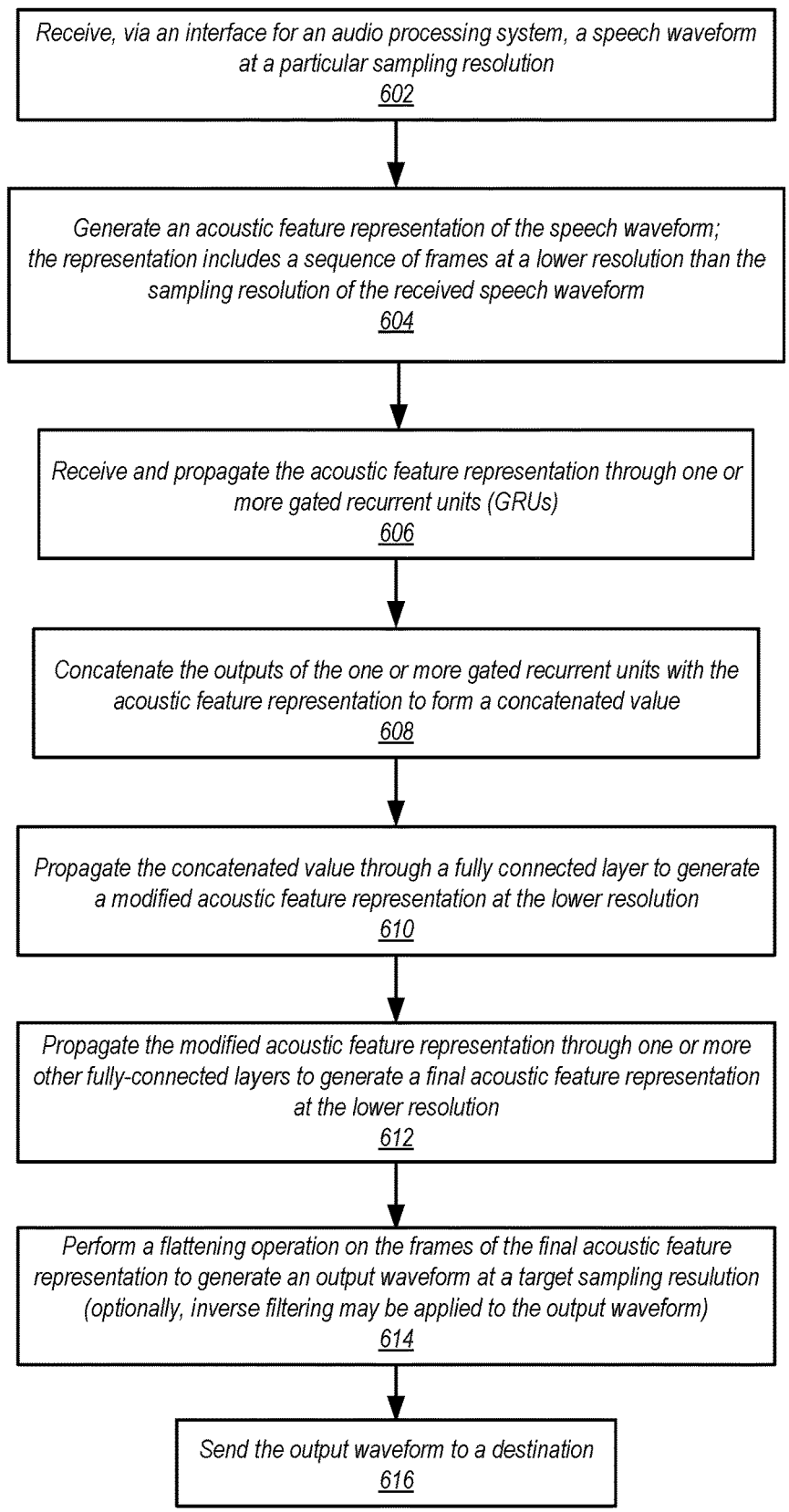
FIG. 6 illustrates a high-level flowchart of various methods and techniques to implement efficient voice synthesis using frame-based processing, according to some embodiments.

Audio-transmission service 210 processes captured audio data 312 through audio processing 215 (e.g., through frame-based processing), in various embodiments. For example, an audio processing systems like those discussed with regard to FIGS. 1 and 4-6 are implemented to provide enhanced audio data 314, including an output waveform as discussed above with regard to FIG. 1 and below with regard to FIGS. 4-6. Audio transmission 213 receives the enhanced audio data 314, identify a destination for the enhanced audio, such as audio playback device 320, and send the enhanced audio data 316 to audio playback device 320, in some embodiments. Given the improvements to audio quality provided by audio processing, including the reduction of noisy bands with ratio mask post-filtering, audio playback device 320 plays the enhanced audio data 316 to one or more listeners (e.g., which may benefit from the improvements to the captured audio data in the form of more clear and perceptible speech).

Audio processing systems also is implemented separately from audio-transmission service 210, in some embodiments. For example, in FIG. 3B, the device with audio sensor 330 also implements audio processing or the audio playback device implement audio processing (e.g., receiver-side processing to re-construct a signal), such as with a system for audio processing like those discussed with regard to FIG. 1 or FIGS. 4-6. In embodiments, the audio processing is implemented as part of other pre-transmission or post-transmission processing, such as various encryption, compression, or other operations performed on capture audio data prior to transmission to audio-transmission service 210. In some embodiments, the audio transmission/processing is performed by the audio-transmission service 210. For example, the audio-transmission service 210 may be implemented as a mixing server that receives audio data from any number of parties/speakers for a meeting, and processes/decodes the audio data before sending it on to the audio playback device(s).

Device with audio sensor 330 then sends the captured/enhanced audio data 334 to audio-transmission service 210 for transmission (e.g., via interface 211), in some embodiments. Audio transmission 213 receives the enhanced audio data 334, identifies a destination for the enhanced audio, such as audio playback device 340, and sends the enhanced audio data 336 to audio playback device 340, in some embodiments. As mentioned above, in various embodiments, any portions of the audio processing process may be performed at the local client network (e.g., by the device with audio sensors 330), and remaining portions of the audio processing process may be performed by the provider network.

In some embodiments, audio is stored for later retrieval and/or processing. As illustrated in FIG. 3C, device with audio sensor 350 also implements audio processing 352, which may be a system for audio processing like those discussed below with regard to FIGS. 4-6 to provide enhanced audio data 354, including the output waveform as discussed above with regard to FIG. 1. Audio processing 352 may be implemented as part of other pre-transmission processing implemented by device with audio sensor 350, such as various encryption, compression, or other operations performed on capture audio data prior to storage in storage service 230. Device with audio sensor 350 then stores the captured/enhanced audio data 354 to storage service 230, which stores enhanced audio data 360 until retrieved for future processing and/or playback, in some embodiments.

FIG. 4 illustrates a logical block diagram of an example system for efficient voice synthesis using frame-based processing, according to some embodiments. The system 400 described in FIG. 4 is one example of the system described in FIG. 1, in embodiments. Various additional description for any of the figures, including FIGS. 1 and 4, can be found herein. In the depicted example, five GRUs 402 are used and five fully-connected layers 406 are used for framewise convolution as an example of what may be used to achieve a high quality output waveform with a limited amount of compute resources (e.g., using a particular mobile device). However, depending on the desired level of quality of the output waveform and/or the amount of compute resources available, a different number of GRUs 402 and/or fully-connected layers 406 may be used. For example, for a lower level of quality and/or using a device with fewer compute resources (e.g., smaller/less CPUs/memory), a smaller number of GRUs 402 and/or fully-connected layers 406 may be used. Conversely, for a higher level of quality and/or using a device with more compute resources (e.g., larger/more CPUs/memory), a smaller number of GRUs 402 and/or fully-connected layers 406 may be used. Therefore, depending on desired quality, the amount of available compute resources, and/or any other criteria, any number of GRUs 402 and/or fully-connected layers 406 may be used.

In the example embodiment, the audio processing system receives an acoustic feature representation of a speech waveform (e.g., using a converter on an input signal, as described for FIG. 1). For example, the input signal may be at a particular sampling resolution (e.g., 16 KHz) and include speech data corresponding to a target speaker. The acoustic feature representation includes a sequence of frames at a lower resolution than the sampling resolution (e.g., 100 Hz), wherein a given frame of the sequence of frames comprises a set of values that represent a portion of the acoustic feature representation (256 different feature values in the depicted example).

The audio processing system then propagates the acoustic feature representation through five gated recurrent units 402 (GRUs). The audio processing system then concatenates outputs of each of the GRUs with the acoustic feature representation to form a concatenated value. The audio processing system propagates the concatenated value through a fully connected layer 404 (e.g., linear) to generate a modified acoustic feature representation at the lower resolution (e.g., 100 Hz). In the depicted example, the audio processing system also changes each frame to include a set of 512 values.

In embodiments, the audio processing system then propagates the modified acoustic feature representation through five fully-connected layers 406 to generate a final acoustic feature representation at the lower resolution. In the depicted example, the audio processing system changes each frame to include a set of 160 for the final acoustic feature representation. The audio processing system then performs a flattening operation on the frames of the final acoustic feature representation to generate an output waveform at a target sampling resolution (e.g., 16 KHz (same as the input speech waveform) or some other target resolution).

The audio processing system then sends, via the interface of the audio processing system, the output waveform to a destination. In some embodiments, the speech waveform is captured along with corresponding video data, and the video data may be provided to a same destination as the output waveform.

FIG. 5 illustrates a high-level flowchart of various methods and techniques to implement model training for efficient voice synthesis using frame-based processing, according to some embodiments. In embodiments, the model training is performed by a service of a provider network (e.g., other service 240 or audio-transmission service 210 of FIG. 2). In some embodiments, the model training is performed external to the provider network (e.g., at a network of a client 250 or at a different service provider's network).

At block 502, the audio processing system applies a pre-emphasis filter to the input speech signal. In embodiments, the vocoder learns high frequency components faster than training in the normal signal domain; this benefit may be reinforced by using perceptual filtering. At block 504, the audio processing system then applies perceptual filtering to the signal. At block 506, the audio processing system trains the model(s) using the final signal. Additional description for implementing the pre-emphasis filter, the perceptual filtering, and various other aspects of training may be found below, after the discussion of FIG. 6.

FIG. 6 illustrates a high-level flowchart of various methods and techniques to implement efficient voice synthesis using frame-based processing, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices. In embodiments, the methods and techniques of FIG. 6 are performed by the audio-transmission service 210 and/or audio processing 215 of FIG. 2).

As indicated at 602, an audio processing system receives, via an interface for the audio processing system, a speech waveform at a particular sampling resolution. For example, the input waveform/signal may be received from one or more audio sensors, as discussed above with regard to FIGS. 2-3A and provided to a provider network service, like audio-transmission service 210, or may be received at an audio processing system implemented as part of an edge or other device that performs audio processing before transmitting the enhanced audio data to a provider network service, as discussed above with regard to FIGS. 3B-3C, or may be recorded, uploaded, or otherwise submitted to another system that implements audio processing, as discussed above with regard to FIG. 1. In some embodiments, the audio data is encrypted and/or compressed when received. Accordingly, the received audio data is decrypted and decompressed by the audio processing system.

As indicated at 604, the audio processing system generates an acoustic feature representation of the speech waveform; the representation includes a sequence of frames at a lower resolution than the sampling resolution of the received speech waveform. As indicated block 606, the audio processing system then propagates the acoustic feature representation through one or more GRUs.

At 608, the audio processing system concatenates the outputs of the one or more gated recurrent units with the acoustic feature representation to form a concatenated value. At 610, the audio processing system propagates the concatenated value through a fully connected layer to generate a modified acoustic feature representation at the lower resolution.

At 612, the audio processing system propagates the modified acoustic feature representation through one or more other fully-connected layers to generate a final acoustic feature representation at the lower resolution. In some embodiments, the lower resolution may be below 1000 Hz, between 100 and 1000 Hz, or may be any other suitable value or range of values (e.g., 80 Hz, 200 Hz, 1200 Hz, etc.). At 614, the audio processing system performs a flattening operation on the frames of the final acoustic feature representation to generate an output waveform at a target sampling resolution (e.g., the target sampling resolution may be at a higher resolution than the lower resolution). In embodiments, the flattened signal portions are not overlapped and/or are concatenated without overlap to generate the output waveform. In some embodiments, the audio processing system will apply inverse filtering to the generated output waveform. Various aspects of inverse filtering are described below. At 616, the audio processing system sends the output waveform to a destination.

Although FIGS. 2-6 have been described and illustrated in the context of a provider network implementing an audio-transmission service, the various components illustrated and described in FIGS. 2-6 may be easily applied to other systems that implement audio processing. As such, FIGS. 2-6 are not intended to be limiting as to other embodiments for audio processing.

As mentioned above, although GAN vocoders provide a technique for building high-quality neural waveform generative models, their architectures may require dozens of billion floating-point operations per second (GFLOPS) to generate speech waveforms in a samplewise manner. Therefore, GAN vocoders are challenging to run on CPUs without accelerators or parallel computers. In example embodiments, an architecture for a GAN vocoder depends on recurrent and fully-connected networks to directly generate the time domain signal in a framewise manner (e.g., FIGS. 1 and 4). This may result in considerable reduction of the computational cost and enables very fast generation on GPUs and/or low-complexity CPUs (e.g., in low-powered, mobile devices), compared to traditional techniques.

As illustrated by FIGS. 1 and 4, efficient voice synthesis using frame-based processing (also referred to as "Framewise WaveGAN") may run GAN vocoders in the time domain at the acoustic feature rate, without having to use upsampling layers, which may be the main source of high complexity. In embodiments, this is achieved by making the model generate one frame at a time. Using traditional techniques, in "WaveNet-based" models and "latent-based" models, the feature representations (e.g., values that represent different characteristics of the input signal) starting from the first layer until the last layer are organized as tensors (e.g., objects/data structures) of [Batch_dim, Channel_dim, Tem-poral_dim]; with Temporal_dim equal to the target signal resolution at the output layer. In Framewise WaveGAN, all feature representations may be organized as [Batch_dim, Sequence_dim, Frame_dim], where Sequence_dim is equal everywhere to the acoustic feature resolution that is commonly much smaller than the signal one; and Frame_dim holds the representation of the target frame that is being generated. The final waveform may be obtained by simply flattening the generated frames at the model output. This leads to significant computational savings even with models of large memory footprint.

As discussed above, FIG. 4 depicts an example system for efficient voice synthesis using frame-based processing. In that example architecture, the numbers show [Sequence_dim, Frame_dim] of the output representation from each layer to generate one second of speech waveform at sampling rate of 16 kHz, using conditioning acoustic features at 100 Hz. The example architecture includes two stacks of recurrent and fully-connected layers. The recurrent stack has 5 GRUs to model long-term dependencies of the signal. All GRU outputs are concatenated with the conditioning (e.g., acoustic feature) representation and converted into lower dimensional latent representation through a fully-connected layer. This representation is then utilized by the fully-connected stack that operate in framewise convolutional manner to model the short-term dependencies of the signal.

In embodiments, the term "framewise convolution" refers to a kernel whose elements are frames instead of samples. In the example of FIG. 4, this is implemented by making the fully-connected layer receive at frame index i a concatenation of k frames at indices {i−k+1, . . . , i} from the input tensor, where k is the kernel size. The rest of the operation is same as normal convolution. There is also conditional-framewise convolution that only differs from framewise convolution in concatenating an external feature frame (i.e., conditioning vector) to the layer input. In the model, one framewise convolution layer may receive the latent representation from the previous stack, with a kernel size of 3 frames, stride=dilation=1 frame; and padding in non-causal manner (e.g., 1 look-ahead frame). Hence, if the input tensor to this layer has Frame_dim of 512, then the fully-connected network should have 3*512=1536 input dimensions. In addition, there are 4 conditional framewise convolution layers coming afterwards with a kernel size of 2 frames which are concatenated with 1 conditioning frame provided by the same latent representation obtained from the previous stack; with same stride, dilation and padding applied in causal manner. Therefore, the fully-connected network for this conditional layer has the same dimensionality as the non-conditional one. In this example, all of these framewise convolution operations are running in a single-channel sense; e.g., there is only one fully-connected network per layer. In embodiments, this implementation may be done instead of traditional multi-channel convolution layers to ease the efficient implementation of the model, especially when applying sparsification methods to these layers.

In embodiments, for all layers in the recurrent and framewise convolution stacks, a Gated Linear Unit (GLU) may be used to activate their feature representations:

$$GLU(X)=X \otimes \sigma(FC(X))$$

where FC is a simple fully-connected network to learn the sigmoid gate and it has the same output dimension as X, $\otimes$ denotes element-wise multiplication. In embodiments, the bias for all layers in the model is disabled; which allows for faster convergence with lower reconstruction artifacts.

In some embodiments, a particular type of acoustic features (e.g., acoustic features used by LPCNet or any other type of neural speech synthesizer) are used to condition a vocoder model that is used for the generation of the acoustic feature representation (e.g., the acoustic feature representation that is provided as input in FIG. 1 or 4). In an embodiment, the features may consist of 18 Bark-Frequency Cepstral Coefficients (BFCCs), a pitch period and a pitch correlation; which are extracted by 20 ms overlapping windows at 100 Hz frame rate from a 16 kHz speech waveform. The model may generate one 10 ms frame per conditioning vector. The pitch period is fed to an embedding layer of 256 levels and 128 dimensions, while the BFCCs with the pitch correlation are fed to a simple causal convolution layer of 128 output channels and kernel size of 3. The outputs from these two layers are then concatenated and fed to another causal convolution layer of 256 output channels, kernel size of 3 and Leaky_ReLU activation to obtain the acoustic feature representation that is used for framewise generation, as shown in FIG. 4. In embodiments, LPCNet features are calculated on 10 ms frames with 5 ms look-ahead; and Framewise WaveGAN requires one feature frame look-ahead. Hence, the total delay may be 10 ms for framing plus 15 ms look-ahead, which sums to 25.

Speech signals are characterized by their high dynamic range as they go wider in bandwidth. When applying a simple pre-emphasis filter before training, the vocoder may be able to learn high frequency components faster than training in the normal signal domain. This benefit may be reinforced by additionally using perceptual filtering, so that the vocoder can learn high frequency content even faster. In an embodiment, the perceptual weighting filter may be defined by the following transfer function:

$$W(z) = \frac{A(z/\gamma_1)}{(1 - \gamma_2 z^{-1})}$$

where A(z) is the linear prediction (LPC) filter whose coefficients are computed from BFCCs, $\gamma 1=0.92$ and $\gamma 2=0.85$. This filtering increases the spectral flatness of signals during the training, which enables clearly faster convergence. Moreover, when applying inverse filtering to obtain the final signal, the noise of reconstruction artifacts is shaped by $W^{-1}(z)P^{-1}(z)$, where $P^{-1}(z)$ is the de-emphasis applied at end of the synthesis. The computational cost of this perceptual filtering is also quite cheap and still keeps the over-all complexity low.

In various embodiments, the model is first pre-trained using a spectral reconstruction loss $L_{aux}$. This may be a combination of spectral magnitude and convergence losses obtained by different STFT resolutions. All power-of-two FFT sizes between 64 and 2048 may be used (6 sizes), with same values for window sizes and 75% window overlap. For the spectral magnitude loss $L_{mag}$, a sqrt may be applied instead of log as a non-linearity, which may be better for early convergence. The spectral pre-training may give a metallic-sounding signal with over-smoothed high frequency content, which is a good prior signal to start adversarial training for achieving realistic signal reconstruction.

In some embodiments, using time-domain discriminators may be a major challenge in adversarial training of the model. Multi-resolution spectrogram discriminators may be used, which achieve better training behavior and reliably increase the fidelity of generated signals, compared to traditional techniques. In some embodiments, 6 models may be used running on spectrograms of the same STFT resolutions used for spectral pre-training; with sqrt used as a nonlinearity. The adversarial training uses least-square loss as a metric for evaluating discriminator outputs. The spectral reconstruction loss may be kept to regularize the adversarial training. Hence, the final generator objective is:

$$\min_G \left( \mathbb{E}_Z \left[ \sum_{k=1}^{6} (D_k(G(s))-1)^2 \right] + \mathcal{L}_{aux}(G) \right)$$

where s represents the conditioning features (e.g., LPCNet features). Weight normalization may be applied to all convolution layers of the discriminators ($D_k$) and all fully-connected layers of the generator (G).

The methods described herein may in various embodiments be implemented by any combination of hardware and software. For example, in one embodiment, the methods are implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the audio processing system described herein). The various methods as illustrated in the figures and described herein represent example embodiments of methods. The order of any method may be changed, and various elements may be added, reordered, combined, omitted, modified, etc.

Figure 7:
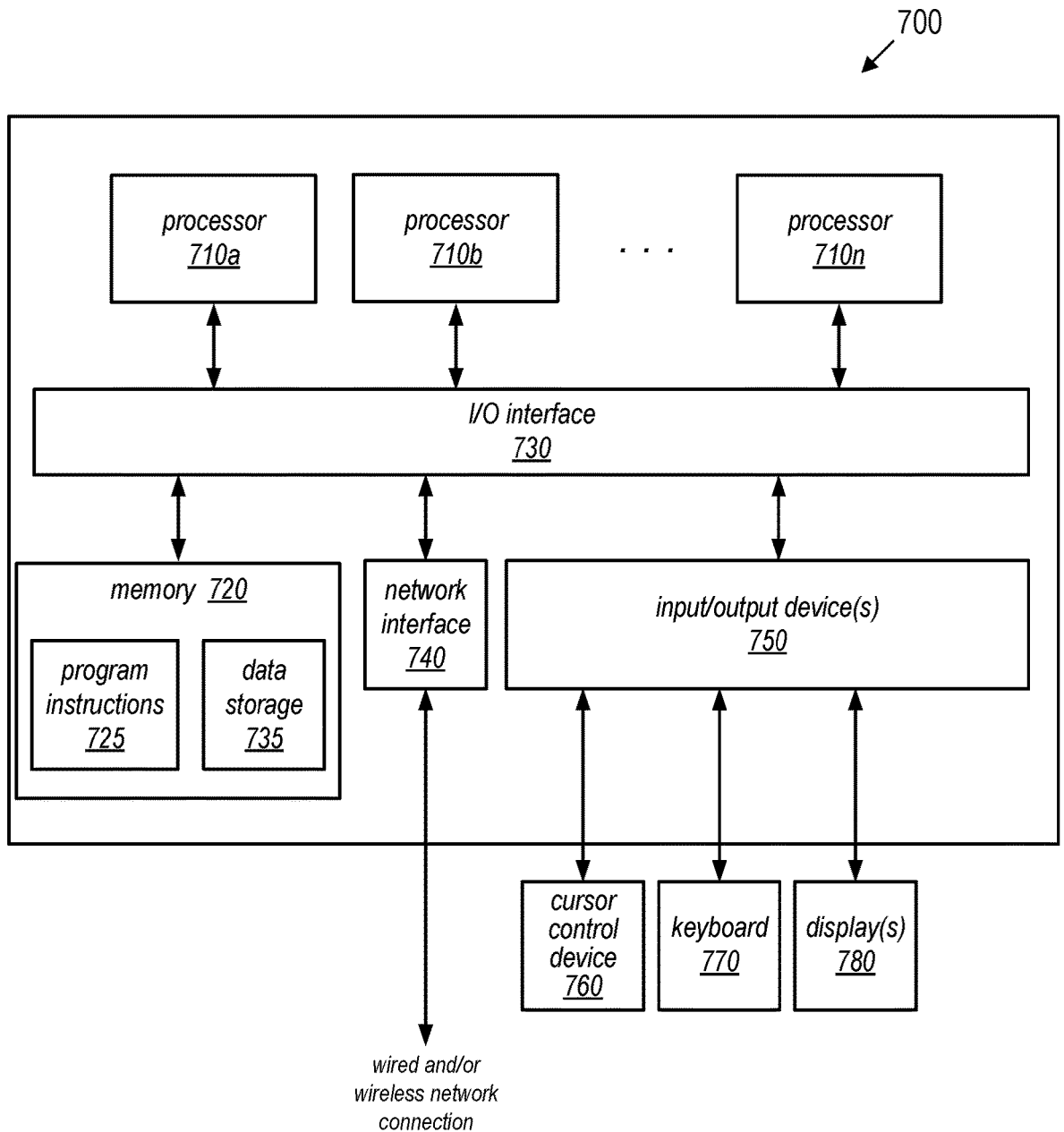
FIG. 7 illustrates an example system to implement the various methods, techniques, and systems described herein, according to some embodiments.

Embodiments of efficient voice synthesis using frame-based processing as described herein may be executed on one or more computer systems, which may interact with various other devices. One such computer system is illustrated by FIG. 7. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. Display(s) 780 may include standard computer monitor(s) and/or other display systems, technologies or devices. In at least some implementations, the input/output devices 750 may also include a touch or multi-touch enabled device such as a pad or tablet via which a user enters input via a stylus-type device and/or one or more digits. In some embodiments, it is contemplated that embodiments may be implemented using a single instance of computer system 700, while in other embodiments multiple such systems, or multiple nodes making up computer system 700, may host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device. Modem GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 720 may store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio processing as described above are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a non-transitory, computer-readable storage medium may include storage media or memory media such as magnetic or optical media, e.g., disk or CD/DVD-ROM coupled to computer system 700 via I/O interface 730. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, that implement the various methods and techniques as described herein, including the application of efficient voice synthesis using frame-based processing, comprising various data accessible by program instructions 725. In one embodiment, program instructions 725 may include software elements of embodiments as described herein and as illustrated in the Figures. Data storage 735 may include data that may be used in embodiments. In other embodiments, other or different software elements and data may be included.

Those skilled in the art will appreciate that computer system 700 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    at least one processor; and
    a memory, storing program instructions that when executed by the at least one processor, cause the at least one processor to implement an audio processing system, the audio processing system configured to:
        receive an acoustic feature representation of a speech waveform, wherein the acoustic feature representation comprises a sequence of frames at a lower resolution than a sampling resolution of the speech waveform, and wherein a given frame of the sequence of frames comprises a set of values that represent a portion of the acoustic feature representation
        propagate the acoustic feature representation through one or more gated recurrent units (GRUs);
        concatenate outputs of the one or more GRUs with the acoustic feature representation to form a concatenated value;
        propagate the concatenated value through a fully connected layer to generate a modified acoustic feature representation at the lower resolution;
        propagate the modified acoustic feature representation through one or more other fully-connected layers to generate a final acoustic feature representation at the lower resolution;
        perform a flattening operation on the frames of the final acoustic feature representation to generate an output waveform at a target sampling resolution higher than the lower resolution, wherein flattened signal portions are not overlapped or are concatenated without overlap to generate the output waveform; and
        send the output waveform to a destination.

2. The system of claim 1, wherein the modified acoustic feature representation comprises another sequence of frames at the lower resolution, and wherein a given frame of the other sequence of frames comprises another a set of values that represent a portion of the modified acoustic feature representation, and wherein a quantity of the other set of values that represent the portion of the modified acoustic feature representation is different than a quantity of the set of values that represent the portion of the acoustic feature representation.

3. The system of claim 1, wherein the one or more GRUs model long-term dependencies of the speech waveform and the one or more other fully-connected layers model short-term dependencies of the speech waveform.

4. The system of claim 1, wherein the system further comprises audio sensors that capture the speech waveform and wherein the destination is an audio-transmission service implemented as part of a provider network that transmits the output waveform to an audio playback device over a network connection.

5. The system of claim 1, wherein the audio processing system is implemented as part of an audio-transmission service offered by a provider network, wherein an interface for the audio processing system supports receiving the speech waveform via a network connection, and wherein the destination is an audio playback device identified by the audio-transmission service for the output waveform.

6. A method, comprising:
    receiving an acoustic feature representation of a speech waveform, wherein the acoustic feature representation comprises a sequence of frames at a lower resolution than a sampling resolution of the speech waveform, and wherein a given frame of the sequence of frames comprises a set of values that represent a portion of the acoustic feature representation;
    propagating the acoustic feature representation through one or more recurrent neural networks;
    concatenating outputs of the one or more recurrent neural networks with the acoustic feature representation to form a concatenated value;
    propagating the concatenated value through a fully connected layer to generate a modified acoustic feature representation at the lower resolution;
    propagating the modified acoustic feature representation through one or more other fully-connected layers to generate a final acoustic feature representation at the lower resolution; and
    flattening the final acoustic feature representation to generate an output waveform at a target sampling resolution, wherein flattened signal portions are not overlapped or are concatenated without overlap to generate the output waveform.

7. The method of claim 6, wherein the one or more recurrent neural networks comprise one or more gated recurrent units (GRUs).

8. The method of claim 7, wherein the modified acoustic feature representation comprises another sequence of frames at the lower resolution, and wherein a given frame of the other sequence of frames comprises another a set of values that represent a portion of the modified acoustic feature representation, and wherein a quantity of the other set of values that represent the portion of the modified acoustic feature representation is different than a quantity of the set of values that represent the portion of the acoustic feature representation.

9. The method of claim 8, wherein the quantity of the other set of values that represent the portion of the modified acoustic feature representation is larger than the quantity of the set of values that represent the portion of the acoustic feature representation.

10. The method of claim 8, wherein a quantity of a different set of values that represent a portion of the final acoustic feature representation is smaller than the quantity of the other set of values that represent the portion of the modified acoustic feature representation.

11. The method of claim 6, wherein the one or more recurrent neural networks model long-term dependencies of the speech waveform and the one or more other fully-connected layers model short-term dependencies of the speech waveform.

12. The method of claim 6, wherein the one or more other fully-connected layers respectively comprise a single fully-connected network.

13. The method of claim 6, further comprising:
storing the output waveform to a data storage service offered by a provider network.

14. The method of claim 6, further comprising:
sending the output waveform to an audio-transmission service implemented as part of a provider network that transmits the output waveform to an audio playback device over a network connection.

15. One or more non-transitory, computer-readable storage media, storing program instructions that when executed on or across one or more computing devices cause the one or more computing devices to implement:
receiving an acoustic feature representation of a speech waveform, wherein the acoustic feature representation comprises a sequence of frames at a lower resolution than a sampling resolution of the speech waveform, and wherein a given frame of the sequence of frames comprises a set of values that represent a portion of the acoustic feature representation;
propagating the acoustic feature representation through one or more recurrent neural networks;
concatenating outputs of the one or more recurrent neural networks with the acoustic feature representation to form a concatenated value;
propagating the concatenated value through a fully connected layer to generate a modified acoustic feature representation at the lower resolution;
propagating the modified acoustic feature representation through one or more other fully-connected layers to generate a final acoustic feature representation at the lower resolution; and
flattening the final acoustic feature representation to generate an output waveform at a target sampling resolution, wherein flattened signal portions are not overlapped or are concatenated without overlap to generate the output waveform.

16. The one or more non-transitory, computer-readable storage media of claim 15, wherein the one or more recurrent neural networks comprise one or more gated recurrent units (GRUs).

17. The one or more non-transitory, computer-readable storage media of claim 15, wherein the modified acoustic feature representation comprises another sequence of frames at the lower resolution, and wherein a given frame of the other sequence of frames comprises another a set of values that represent a portion of the modified acoustic feature representation, and wherein a quantity of the other set of values that represent the portion of the modified acoustic feature representation is different than a quantity of the set of values that represent the portion of the acoustic feature representation.

18. The one or more non-transitory, computer-readable storage media of claim 15, wherein the one or more recurrent neural networks model long-term dependencies of the speech waveform and the one or more other fully-connected layers model short-term dependencies of the speech waveform.

19. The one or more non-transitory, computer-readable storage media of claim 15, further comprising program instructions that when executed on or across the one or more computing devices cause the one or more computing devices to implement:
sending the output waveform to an audio-transmission service implemented as part of a provider network that transmits the output waveform to an audio playback device over a network connection.

20. The one or more non-transitory, computer-readable storage media of claim 15, wherein the speech waveform is captured along with corresponding video data that is provided to a same destination as the output waveform.

* * * * *